United States Patent
Doherty et al.

(10) Patent No.: US 6,961,415 B2
(45) Date of Patent: *Nov. 1, 2005

(54) METHOD AND SYSTEM FOR FACILITATING TELECOMMUNICATIONS SERVICE PROVISIONING AND SERVICE ASSURANCE

(75) Inventors: Alan G. Doherty, Kitchener (CA); Neil S. Rieck, Kitchener (CA); Stephen M. Kennel, Bright (CA); Terry J. Shannon, London (CA); Robert H. Yip, London (CA)

(73) Assignee: Bell Canada, Montreal (CA)

( * ) Notice: Subject to any disclaimer, the term of this patent is extended or adjusted under 35 U.S.C. 154(b) by 0 days.

This patent is subject to a terminal disclaimer.

(21) Appl. No.: 10/820,670

(22) Filed: Apr. 8, 2004

(65) Prior Publication Data

US 2004/0190699 A1 Sep. 30, 2004

Related U.S. Application Data

(63) Continuation of application No. 09/874,535, filed on Jun. 5, 2001, now Pat. No. 6,735,293.

(51) Int. Cl.[7] .............................. H04M 3/22; H04M 3/42
(52) U.S. Cl. ............................. 379/201.12; 379/15.01; 379/15.03; 379/399.01
(58) Field of Search ......................... 379/1.01, 9, 9.03, 379/15.01, 27.01, 201.01, 207.02, 399.01, 413.02, 413.03, 15.03, 201.12; 700/99; 705/7, 8, 9, 11

(56) References Cited

U.S. PATENT DOCUMENTS

| | | | |
|---|---|---|---|
| 4,972,453 A | 11/1990 | Daniel et al. | 379/9.03 |
| 5,455,856 A | 10/1995 | Story | 379/327 |
| 5,644,619 A | 7/1997 | Farris et al. | 379/29.01 |
| 5,682,421 A | 10/1997 | Glovitz et al. | 379/100.05 |
| 5,687,212 A | 11/1997 | Kinser et al. | 379/9.03 |
| 5,790,631 A | 8/1998 | Minarczik et al. | 379/2 |
| 5,790,634 A | 8/1998 | Kinser et al. | 379/29.01 |
| 5,859,895 A | 1/1999 | Pomp et al. | 379/9.05 |
| 5,875,242 A | 2/1999 | Glaser et al. | 379/201.05 |
| 5,881,131 A | 3/1999 | Farris et al. | 379/15.03 |
| 5,903,372 A | 5/1999 | Czerwiec | 379/399.01 X |
| 5,920,846 A | 7/1999 | Storch et al. | 705/7 |
| 5,953,389 A | 9/1999 | Pruett et al. | 379/9 |
| 6,002,502 A | 12/1999 | Pomp et al. | 398/45 |
| 6,097,515 A | 8/2000 | Pomp et al. | 398/45 |
| 6,266,395 B1 | 7/2001 | Liu et al. | 379/27.01 |
| 6,587,851 B1 | 7/2003 | Ditcharo et al. | 707/6 |
| 6,614,882 B1 | 9/2003 | Beamon et al. | 379/27.01 |
| 6,735,293 B2 * | 5/2004 | Doherty et al. | 379/201.12 |

FOREIGN PATENT DOCUMENTS

CA 2261705 2/1998 ............ 379/201.05

* cited by examiner

*Primary Examiner*—Harry S. Hong
(74) *Attorney, Agent, or Firm*—Van Dyke, Gardner, Linn & Burkhart, LLP

(57) ABSTRACT

An automated system coordinates, controls and polices installation of customer premise equipment (CPE) for telecommunications services and provides continuing service assurance. The system verifies equipment availability on service request, schedules a qualified technician to install the CPE, and assigns distribution equipment resources to the CPE. The system notifies the technician of the installation date. The equipment resources are auto-assigned to the CPE to facilitate installation procedures. The system also auto-detects installation of the CPE and auto-enables service when the CPE is installed. Customer record creation and maintenance is automatic, and installation or operation of unauthorized equipment is inhibited. Post-installation monitoring and automatic scheduling of repair for system or equipment faults ensures continuing service assurance. The advantage is reduced service delivery time, reduced operations costs and increased customer satisfaction.

45 Claims, 9 Drawing Sheets

METHOD AND SYSTEM FOR FACILITATING TELECOMMUNICATIONS SERVICE PROVISIONING AND SERVICE ASSURANCE

CROSS-REFERENCE TO RELATED APPLICATIONS

This application is a continuation of U.S. patent application Ser. No. 09/874,535, filed Jun. 5, 2001 U.S. Pat. No. 6,735,293 which issued on May 11, 2004, which is hereby incorporated herein by reference.

MICROFICHE APPENDIX

Not Applicable.

TECHNICAL FIELD

The present invention relates to telecommunications service provisioning and service assurance and, in particular, to a method and system for facilitating the provisioning of telecommunications services and for monitoring provisional equipment to facilitate continuous service assurance.

BACKGROUND OF THE INVENTION

Telephone companies around the world are realizing that it is possible to include existing twisted-pair loops in their next generation broadband access networks. Hybrid Fiber Coaxial (HFC), which is well suited to analog and digital broadcast, is proving to be less than ideal for carrying voice telephony, interactive video and high-speed data communications at the same time. Fiber To The Home (FTTH) is still prohibitively expensive in a marketplace that is driven by competition rather than cost. An alternative, which is now commercially practical, is a combination of fiber cables feeding neighborhood Optical Network Units (ONUs) with final leg connections through existing twisted copper pairs used for providing telephone service. This network topology is commonly referred to as Fiber to the Neighborhood (FTTN). It uses fiber optic cable to deliver broadband services to distribution points in high-density neighborhoods or Multiple Dwelling Units (MDU), such as apartment buildings, condominiums and the like.

One of the enabling technologies for FTTN is Very high rate Digital Subscriber Line (VDSL). VDSL transmits high-speed data over short reaches of twisted copper pair telephone loops at downstream rates of up to 53 megabits per second over short loops, with slower speeds over longer loops. Upstream rates are slower but up to 19 megabits per second on short loops can be achieved. The data channels on VDSL are separated in frequency from bands used for Plain Old Telephone Services (POTS) and Integrated Services Digital Network (ISDN). This enables service providers to overlay VDSL on existing telephone services. Consequently, converged service offerings that permit television, high-speed Internet, and telephone services to be offered concurrently over the same twisted pair are now available. As is well understood, the delivery of such services requires complex interworking of different service provider networks. Converged services are therefore complicated to provision and provisioning can contribute significantly to start-up costs.

The provisioning of broadband services to customers has long been recognized as an area in which competitive advantage can be gained, provided the process can be at least partially automated. For example, U.S. Pat. No. 5,903,372, which issued on May 11, 1999 to Czerwiec, describes an Optical Network Unit (ONU) for installation in the neighborhood of primary and secondary video service subscribers. The ONU includes a switch matrix card for installation in the ONU with connections to POTS cards for a number of primary subscribers over a corresponding number of twisted pair copper loops. Twisted pair copper loops are also adapted to permit switch connection to switchable video cards. The switchable video cards permit video services to be enabled and disabled using a remote control work station without the dispatch of a service technician. While this invention has merit, it does not address service provisioning and service assurance.

The problems associated with the provisioning of telecommunications services remain, as do the problems associated with telecommunications service assurance. There therefore exists a need for a method and system that facilitates telecommunications service provisioning and service assurance in order to reduce start-up costs and ensure customer satisfaction by providing telecommunications services that are rapidly and reliably enabled on a promised installation date, and consistently and efficiently maintained on a continuing basis.

SUMMARY OF THE INVENTION

The invention provides a system for facilitating service provisioning and service assurance for telecommunications services, especially converged services that are enabled through such technologies as Fiber to the Neighborhood and Asynchronous Data Subscriber Line, for example.

The system includes a service provisioning and service assurance server (SPA) and operator terminals that permit service operators to post customer requests for service provisioning and service problem correction. Most of the coordination and scheduling of the provisioning and problem correction processes are performed or monitored by the SPA. Each provisioning job is scheduled and tracked by the SPA. Work orders are automatically generated in accordance with technician work schedules and skill levels, and the work orders are dispatched electronically to the technician assigned to perform a service installation or equipment repair. After a work order is dispatched, the work order is tracked to ensure that the work order is completed, with automatic interim rescheduling, if required. Any discrepancies are reported to system operations and management, to permit potential problems to be dealt with quickly and effectively.

The SPA also tracks the location and status of each customer premise equipment unit, and ensures that only registered units are permitted to access service from the service providers. Inventory tracking is also performed, and automatic reordering of customer premise equipment when inventory is low is preferably enabled.

The SPA also facilitates telecommunications service assurance after service provisioning. The SPA receives fault alarm messages from service provider network element management systems and examines the alarm messages to isolate alarms that require attention. The SPA attempts to resolve alarms using automated remote control functionality. If an alarm cannot be automatically resolved, the SPA automatically schedules a technician with an appropriate skill level to resolve the malfunction. A work order is created and the work order is electronically dispatched to the technician. The level of the alarm dictates the urgency with which the technician is scheduled. The SPA also accepts trouble reports from customers who report service delivery malfunctions by telephone, for example. The SPA issues work orders and tracks completion of customer-reported malfunctions in the same way as any other work order is tracked to completion.

The SPA therefore provides a method and system that significantly facilitates telecommunications service provisioning and service assurance. Service installation times are reduced, fraud is controlled, inventories are tracked and the status of service delivery equipment is continually tracked to ensure that equipment failures are rapidly corrected to increase customer satisfaction.

BRIEF DESCRIPTION OF THE DRAWINGS

Further features and advantages of the present invention will become apparent from the following detailed description, taken in combination with the appended drawings, in which.

It will be noted that, throughout the appended drawings, like features are identified by like reference numerals.

DETAILED DESCRIPTION OF THE PREFERRED EMBODIMENT

The invention provides a method and system for facilitating telecommunications service provisioning and service assurance. A Services Provisioning and Assurance system (SPA) facilitates the installation and provisioning of Customer Premise Equipment (CPE) for the delivery of converged telecommunications services, as well as continuing service assurance. The SPA automates customer record creation, equipment assignment, installation scheduling, inventory control, Internet service activation, CPE discovery, video service activation, network connectivity, data service address assignments, completion report generation, fault detection and fault resolution scheduling. Consequently, CPE installation, and service activation, is significantly facilitated, service assurance is simplified, and customer satisfaction is enhanced.

Figure 1:
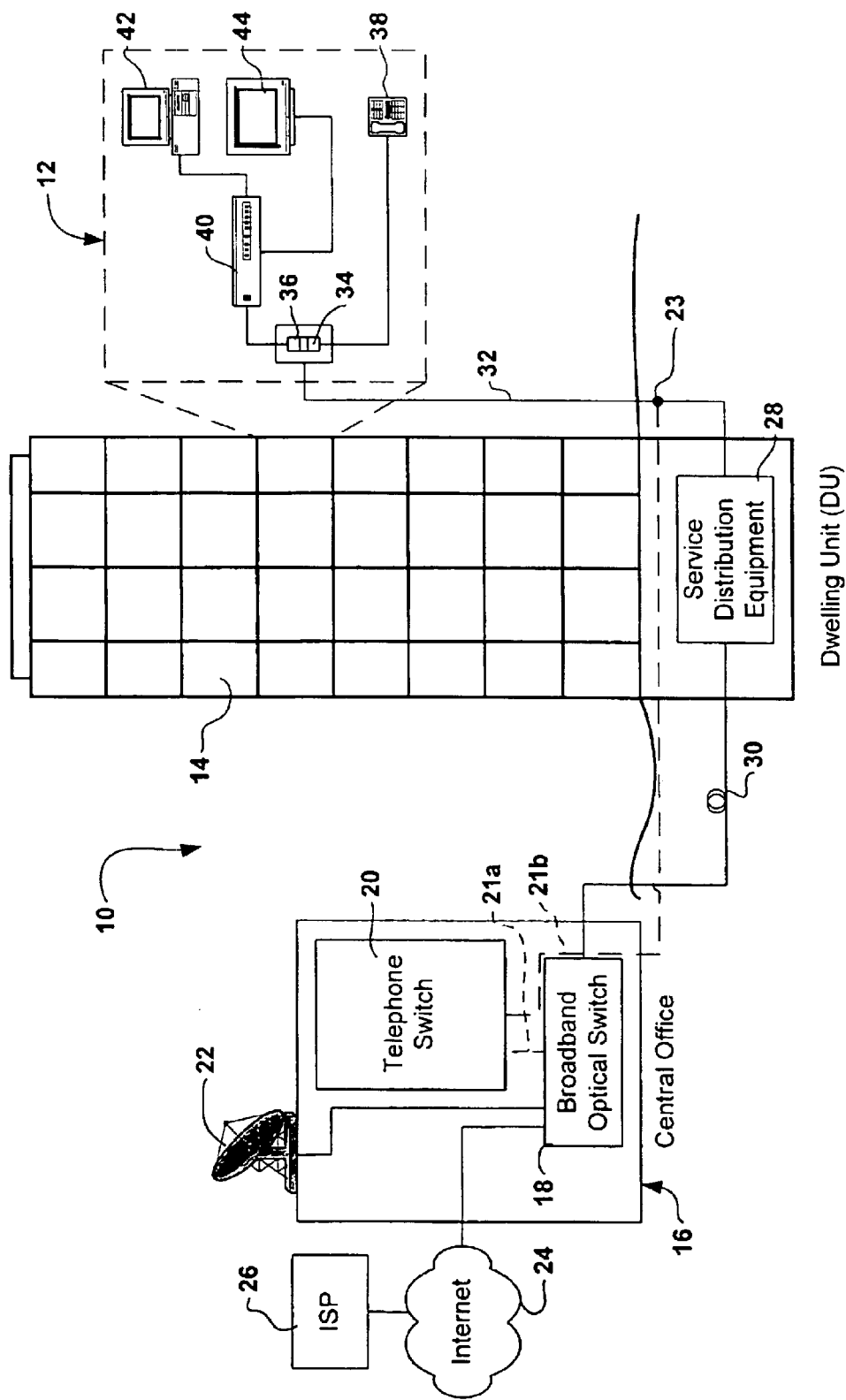
FIG. 1 is a schematic diagram of an exemplary installation of FTTN for providing converged telecommunications services to dwelling units (DUs) in a high density neighborhood.

FIG. 1 is a schematic diagram of an exemplary installation of a Fiber to the Neighborhood (FTTN) 10 for delivering one or more of video content, high-speed Internet and telephony services to a telecommunications services customer 12 who lives in a Multiple Dwelling Unit (MDU) 14, such as an apartment building or condominium. As is well understood by those skilled in the art, FTTN may also be installed in high-density communities where twisted pair loop lengths do not exceed 1,500 meters (4,000 feet). Such communities may include single or multiple dwelling units. For the sake of simplicity, dwelling units served by FTTN are hereinafter referred to simply as dwelling units (DUs), which includes both single and multiple dwelling units.

A telephone service provider having a central office 16 typically provisions the FTTN-delivered telecommunications services. The telephone service provider owns and operates a broadband optical switch 18 which may be connected by an appropriate conductor(s) 21a, using interfaces well-known in the art, to telephone switch 20 for providing Plain Old Telephone Service (POTS). Alternatively, the telephone switch 20 may be connected directly to a distribution panel 23 of a DU 14, in a manner well known in the art, by conductor(s) 21b. Broadband optical switch 18 is connected to a video content provider by, for example, a satellite dish 22 which requires, for example, a Direct Broadcast Service (DBS) or Direct To Home (DTH) video signal that delivers content to the telecommunications services customer 12 via the FTTN network, as will be explained below in more detail. Broadband optical switch 18 is likewise connected to the Internet 24 and an Internet Service Provider (ISP) 26, also in a manner well known in the art. The ISP 26 provides high-speed Internet access to the customer 12. The broadband optical switch 18 is connected to service distribution equipment 28, such as an Optical Network Unit (ONU), well known in the art. One or more fiber optic cables 30 transfer broadband data between the broadband optical switch 18 and the service distribution equipment 28.

The service distribution equipment 28 converts the optical signals into electrical signals that are transferred to the distribution panel 23 where the signals are transferred to a twisted-pair copper loop 32 that is connected to a standard telephone jack 34 installed in the premises of the customer 12. Telephone jack 34 is equipped with a signal splitter 36 to which is connected one or more telephones 38 and Customer Premise Equipment (CPE) 40, which serves as a high-speed data distribution hub frequently referred to as a "set top box". The CPE 40 delivers VDSL signals in an appropriate format to one or more computers 42, typically Personal Computers (PCs) and one or more television sets 44 in a manner well known in the art. Consequently, the customer 12 may enjoy video content delivery, high-speed Internet and telephone services, which are collectively delivered over a twisted copper pair from a single source service provider.

Figure 2:
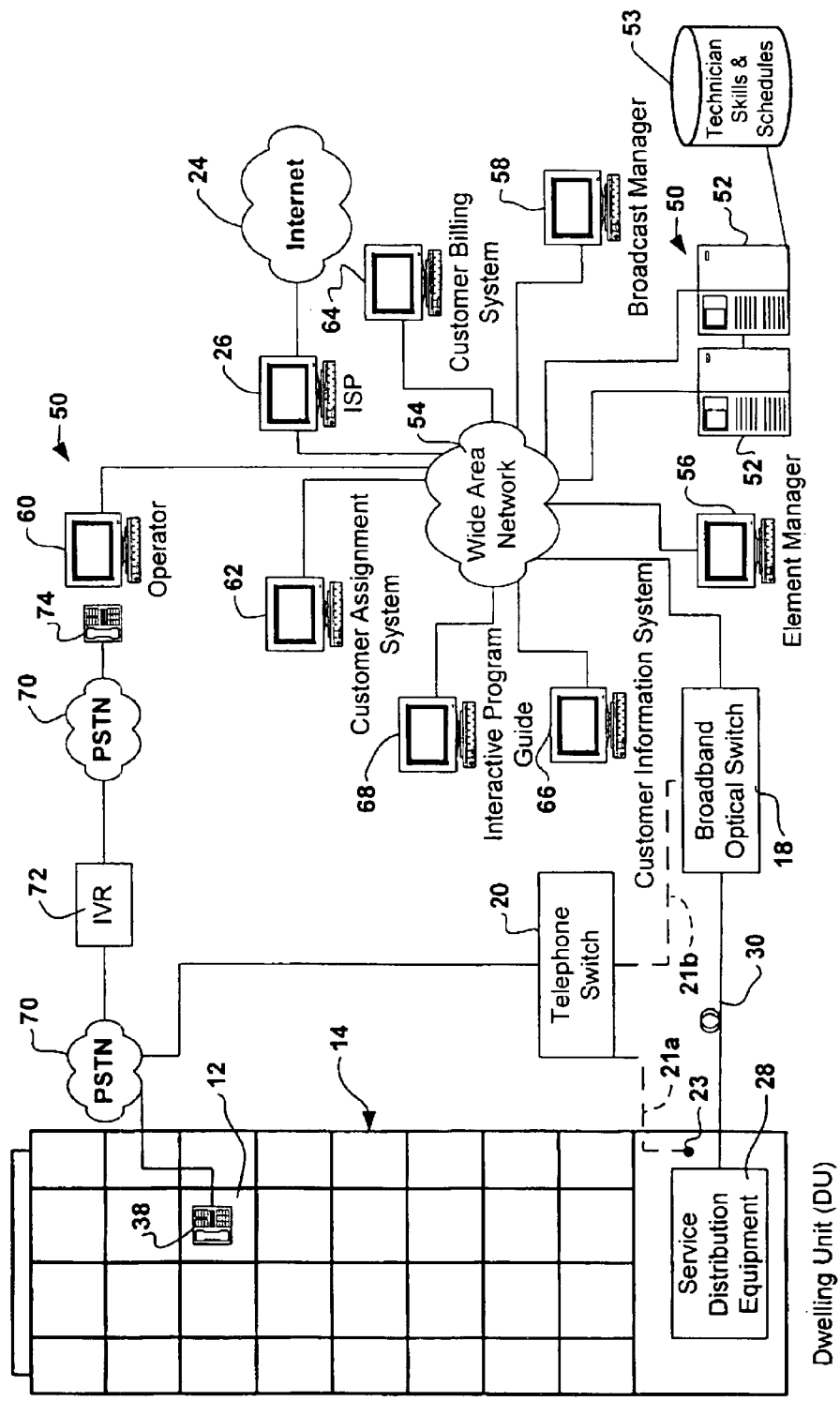
FIG. 2 is a schematic diagram of service provider equipment and a system in accordance with the invention for facilitating service provisioning and service assurance for telecommunications services.

As is well understood by those skilled in the art, the coordination of service delivery and configuration of network interfaces to provide such telecommunications services is a complex undertaking that requires a great deal of technical skill. A telecommunications Service Provisioning and Service Assurance system (SPA) 50 in accordance with the invention is shown in FIG. 2. The SPA 50 facilitates the provisioning process by automating many aspects of provisioning and coordinating the provision of services supported by service providers that contribute to the telecommunications services package subscribed to by a customer 12. The SPA 50 also facilitates service assurance by monitoring faults and scheduling fault resolution. The SPA 50 includes at least one server 52, which is preferably a fully redundant self-governing matched pair of servers 52 well known in the art. The servers 52 are respectively connected to a wide area network 54, or the like, which interconnects the SPA 50 with equipment of service providers that contribute to the services package, as well as other components of the FTTN. The SPA 50 also has access to a database 53 that stores a technician work scheduling application and related data, as well as at least one indicator of a skill level of each technician. The SPA 50 further includes one or more operator workstations 60, the function of which will be explained below in more detail.

Other systems connected directly or indirectly to the wide area network 54 include the ISP 26. A customer assignment system 62 is used for creating and storing customer records and customer line records in a manner well known in the art. A customer billing system 64 is used for creating, tracking, formatting and printing customer bills, also in a manner well known in the art. A content provider customer information system 66 is used for tracking content usage and content delivery rights, also well known in the art. The content provider may employ the services of an interactive program guide service provider, which provides an interactive program guide to enable customer 12 to select content from the content provider using the interactive program guide system 68, likewise well-known in the art. An element manager 56 monitors all CPEs 40 and other network components to detect and report hardware and software faults and raise alarms. Alarm messages are received and processed by the SPA 50, as will be explained below in more detail with reference to FIGS. 5A and 5B. A broadcast manager 58 is responsible for monitoring and enforcing broadcast rights to ensure that services are delivered in accordance with subscriptions and/or service level agreements (SLAs).

Subscription to a telecommunications service package is conveniently effected using a telephone 38 owned by customer 12. Customer 12 typically places a toll-free call through the PSTN 70 that is terminated on an Interactive Voice Response unit (IVR) 72. IVR 72 is programmed to determine whether the customer call is related to a service, billing or subscription issue. If the customer 12 requires a new subscription to one or more telecommunications services, the call is forwarded through PSTN 70 to a telephone 74 of a service operator at the operator terminal 60. The operator terminal 60 is loaded with a template completed by the service operator. Information from the template is used by the SPA 50 in a manner that will be described in detail below with reference to FIGS. 4A–4D.

Figure 3:
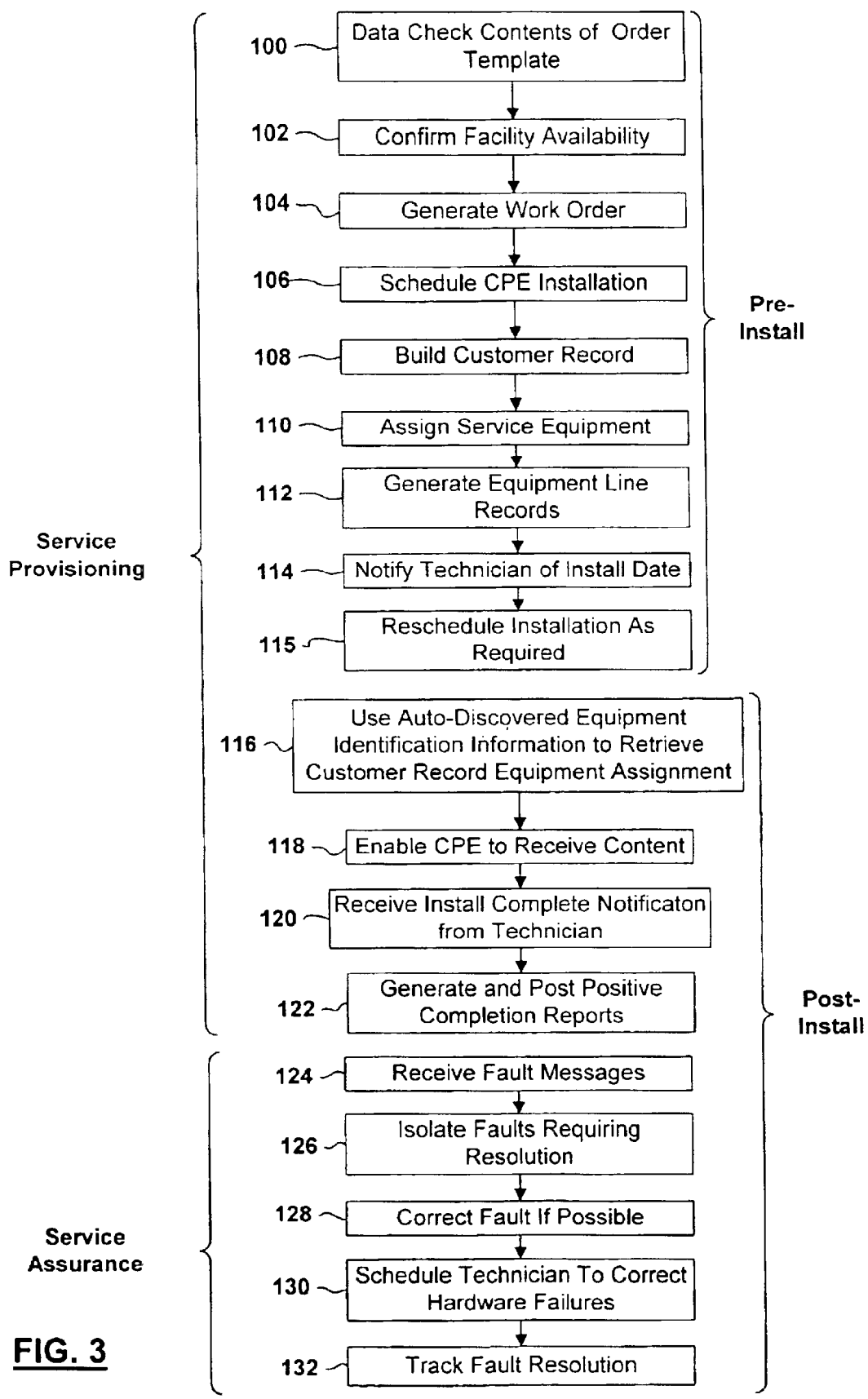
FIG. 3 is a block diagram illustrating general steps involved in service provisioning and service assurance for telecommunications services in accordance with the invention.

FIG. 3 is a block diagram showing the principal functions performed by the SPA 50 during pre-installation and post-installation processing of service provisioning and service assurance. In step 100, the SPA 50 checks contents of the order template in accordance with certain pre-defined data verification rules that will be explained below in more detail with reference to FIGS. 4A–4D. Using the contents of the order template, the SPA 50 confirms (step 102) that telecommunications service facilities are available to serve the customer 12. If the service facilities are available, a work order is generated (step 104). Thereafter, Customer Premise Equipment (CPE) installation is automatically scheduled by the SPA 50 in an interactive process involving the customer, the service operator 60, and the SPA 50, which consults a technician scheduling application to automatically schedule the installation, as will likewise be explained below in more detail.

In step 108, a customer record is built using information from the order template and information respecting the services subscribed to by the customer 12. Thereafter, the equipment that is to be used to deliver the service is automatically selected and recorded in the customer record (step 110). Once the equipment is automatically assigned, equipment line records are auto-generated and attached to the customer record (step 112). A technician is then notified of the installation using, for example, an automated paging or automated e-mail generation (step 114). If installation is not effected on the scheduled date (customer or technician becomes unavailable) then installation is automatically rescheduled as required (step 115). When the CPE has been successfully installed, pre-installation processing is completed.

On receipt of the automated page or e-mail notification, the service technician obtains the CPE 40 (FIG. 1) from an appropriate equipment warehouse and confirms the install date and time with the customer by telephone prior to "truck roll" for the installation of the CPE 40. When the technician arrives at the DU 14 (FIG. 1) on the date of installation, the technician first effects a cross-connect at the service distribution equipment 28 (FIG. 2) using a service distribution equipment identification (terminal address), card number and port number supplied by the SPA 50 in step 114 in which the technician was notified of the install date. The technician then delivers the CPE to customer 12, installs the splitter 36 (FIG. 1), and connects the CPE 40 to the splitter 36. The technician also connects the CPE 40 to an alternating current (AC) power source and powers on the CPE 40. Powering on the CPE 40 commences the post-installation processes outlined in steps 116–122. In step 116, the CPE 40 sends an auto-discovery identification message through the wide area network 54 to the SPA 50 (FIG. 2) on power-on. The SPA 50 uses information associated with the auto-discovery message (terminal address, card and port number) to retrieve the customer record created in step 108. If the customer record is located, the CPE 40 is enabled to receive video content in step 18 (assuming video content was subscribed to, of course). The SPA 50 then waits for the technician to post an installation-complete notification (step 120). On receipt of the notification, the SPA 50 generates and posts a positive-completion report to each service provider contributing to the customer subscription.

Steps 124–132 outline the principal steps involved in service assurance after successful service provisioning. In step 124, the SPA 50 receives fault messages from the element manager 56 (FIG. 2). Faults requiring resolution are isolated in step 126. If possible, the SPA 50 corrects the fault using remote control functionality. If the fault cannot be automatically corrected, the SPA 50 schedules a technician to correct the fault (hardware failure, for example) in step 130. Thereafter, the SPA 50 tracks fault resolution, as will be explained below in more detail with reference to FIGS. 5A and 5B.

FIGS. 4A–4D provide a flow chart that outlines one implementation of the methods effected by the SPA 50 in accordance with the invention. In step 150, the SPA 50 receives information input by a service operator using the operator terminal 60 (FIG. 2). The information input includes customer name, telephone number and a code used for determining the availability of the FTTN service. The code is, for example, a ZIP code, a postal code, or some other code associated with a customer dwelling. The SPA 50 uses the code in a table look-up to determine whether the code is associated with a DU 14 to which FTTN service is available (step 152). If the code indicates that the service is not available, an error message is returned to the service operator terminal 60 in step 154 and the process ends when the service operator informs the customer 12 that no service is available in their area.

Otherwise, the SPA 50 displays provisioned DU(s) (step 156) associated with the code received in step 150. The converged service operator must select the particular DU inhabited by the customer 12 (step 158). If the service operator fails to make a selection within a predetermined time, the SPA 50 returns an error message 160 and again checks to verify that a selection has been made. If the code is associated with a DU, the process automatically proceeds to step 162. In step 162, a table associated with the selected DU is consulted to select the service distribution equipment 28 that will be used to service the customer 12. In step 164, the SPA 50 determines whether the service distribution equipment 28 (FIG. 2) has spare capacity to serve the customer 12. If not, the SPA 50 returns an appropriate error message (step 154) and the process ends, as described above.

Figure 4A:
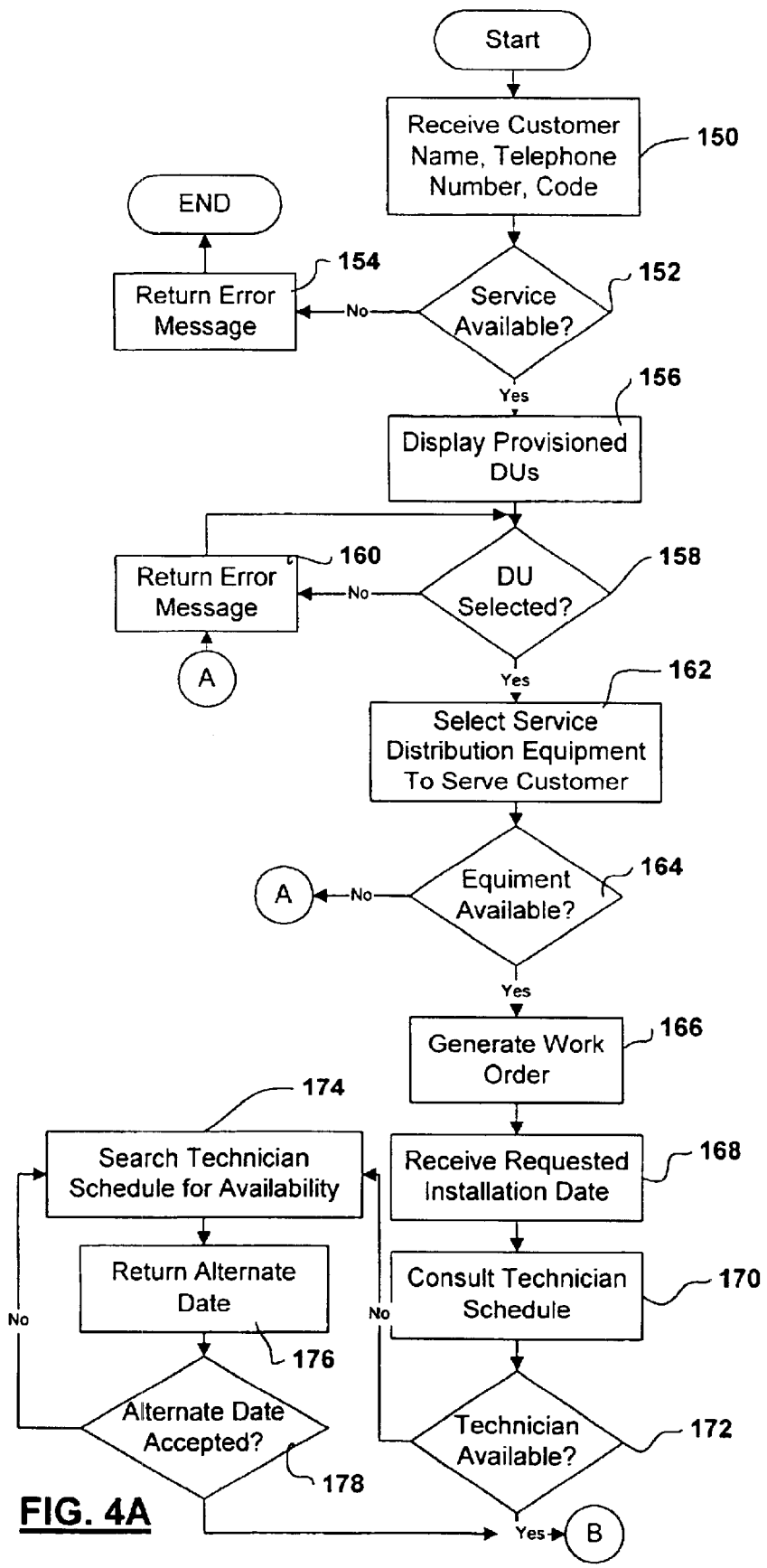
FIGS. 4A–4D are flow charts illustrating the method for automating substantial parts of the provisioning of telecommunications services in accordance with the invention.
Figure 4B:
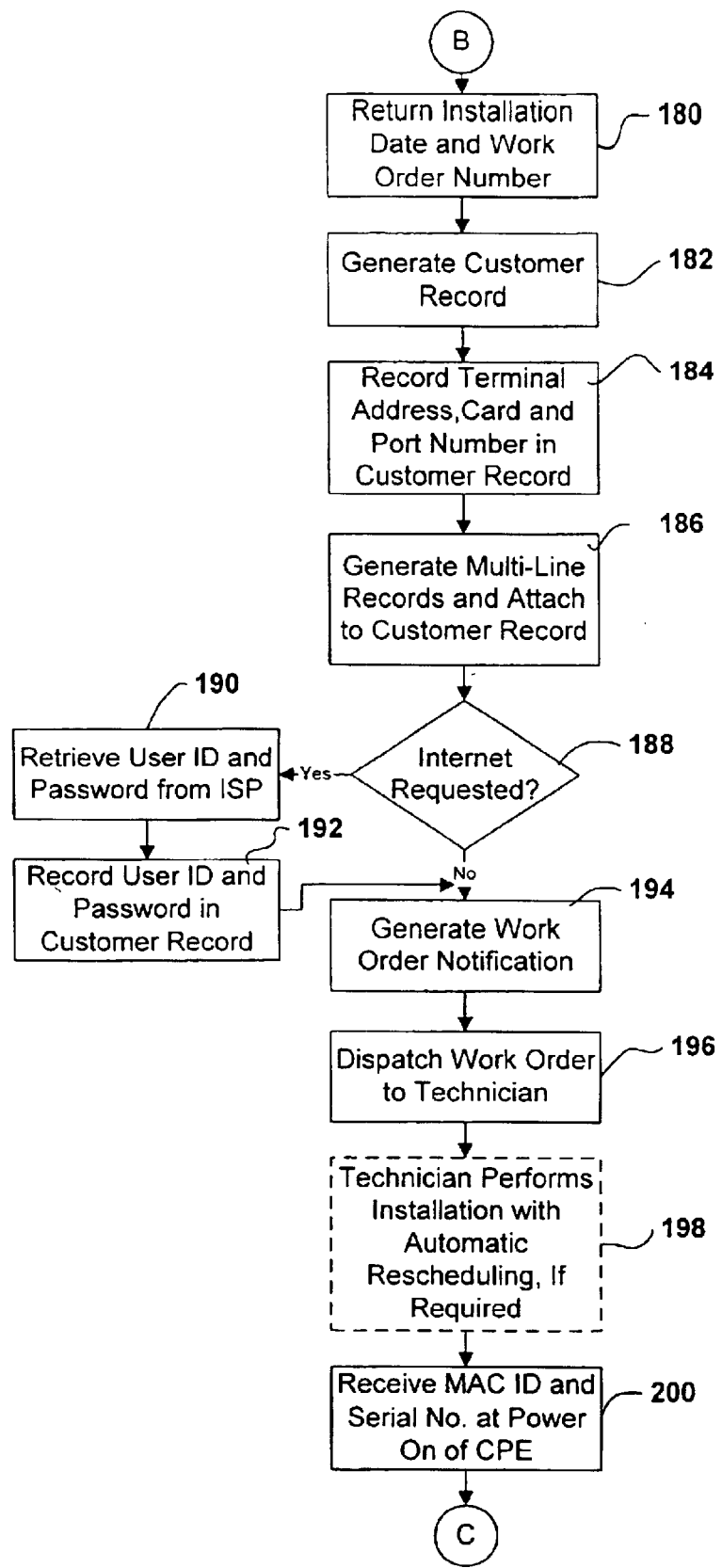
Figure 4C:
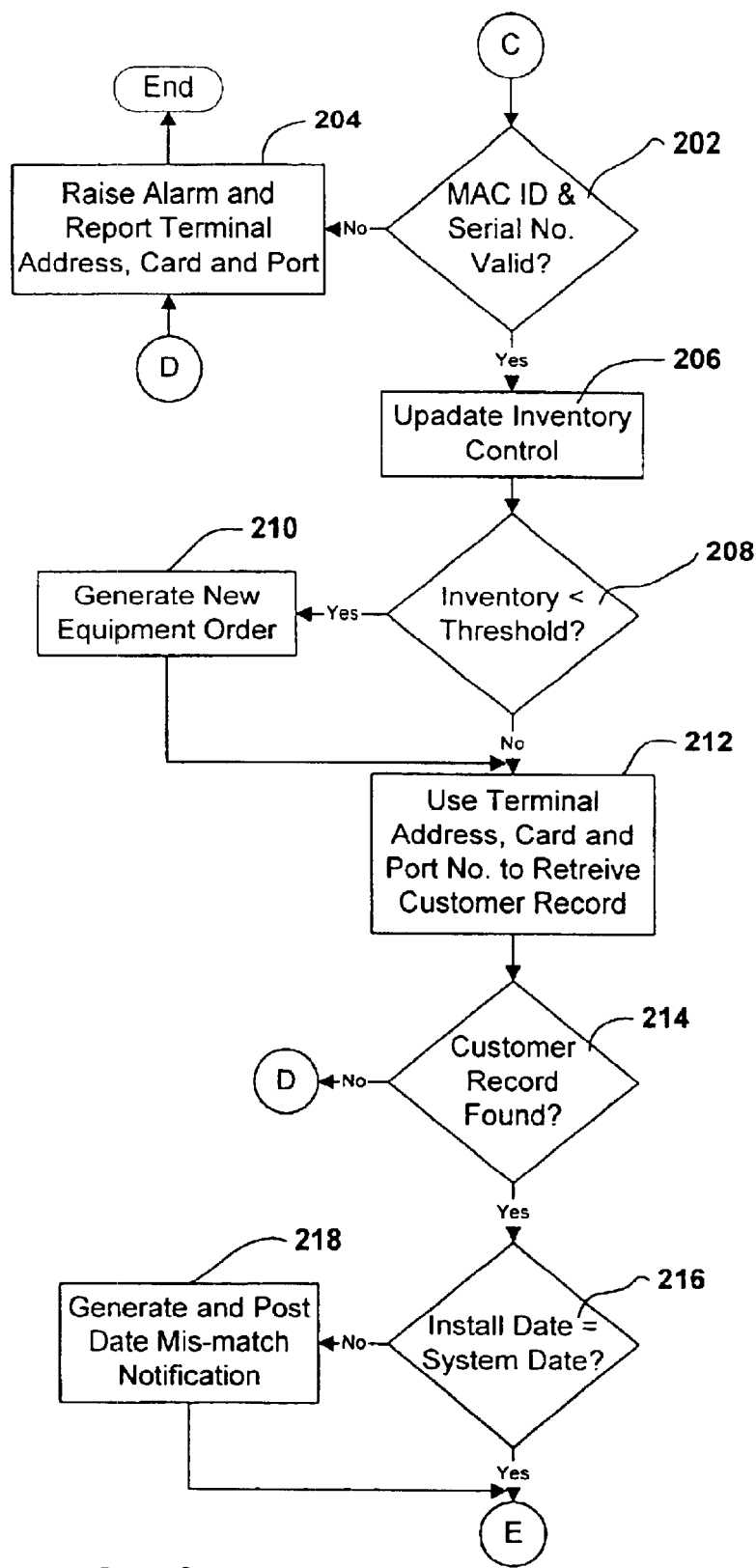
Figure 4D:
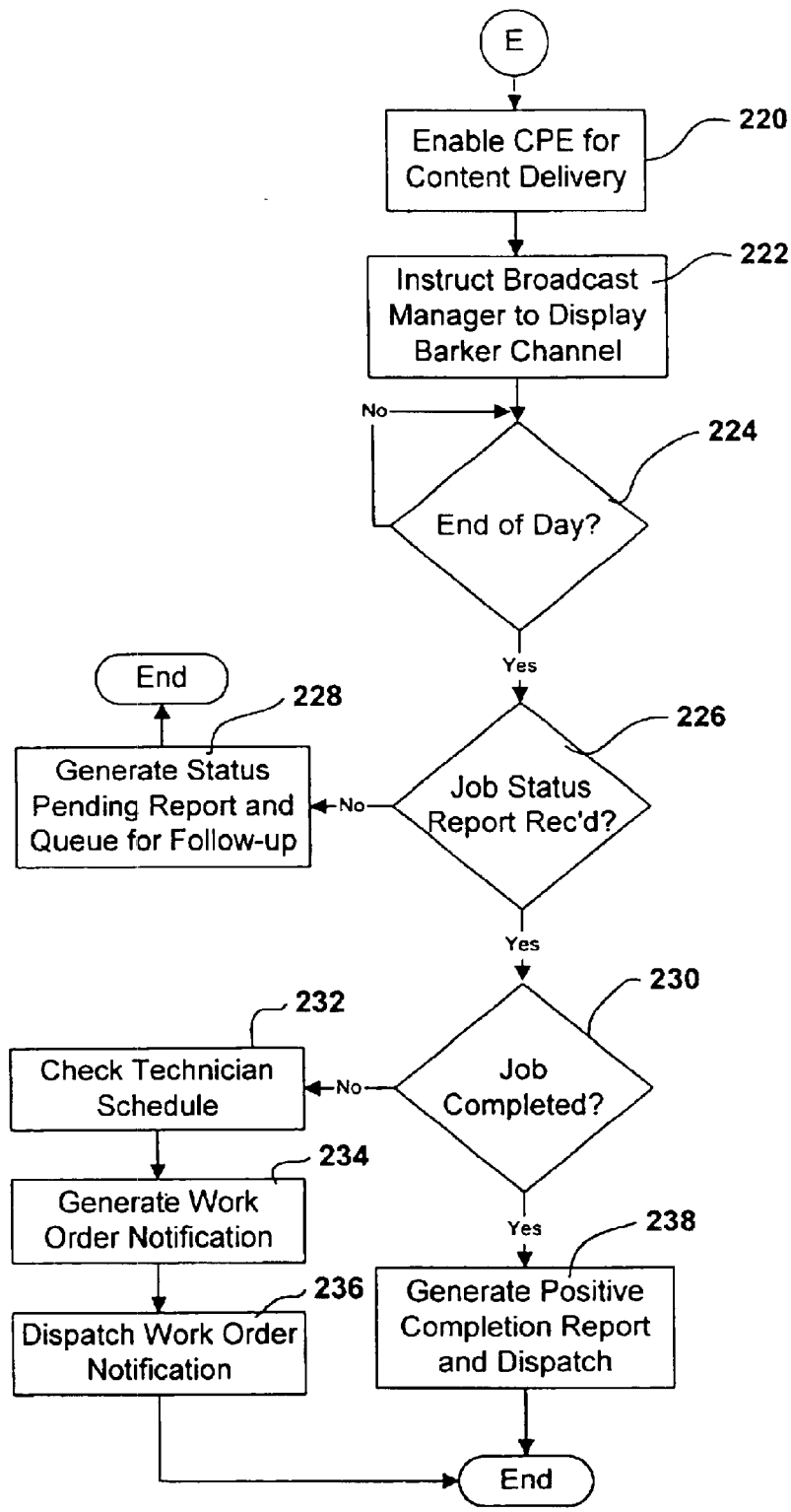

If the service distribution equipment has capacity, a next available distribution terminal is selected to serve the customer by the SPA 50. Thereafter, the SPA 50 generates a work order (step 166) and an associated work order number. Meanwhile, the service operator requests a desired install date from the customer 12. The requested install date is input by the service operator 60 and received by the SPA 50 in step 168. On receipt of the requested install date, SPA 50 consults a technician scheduling application (step 170), which includes a complete list of all technicians, their skill level and their availability for effecting the installation. If it is determined that no technician with an appropriate skill level is available on the requested date (step 172), the SPA 50 searches the technician scheduling table for a next available date (step 174) and returns an alternate date (step 176), and the service operator 60 enquires whether the alternate date is acceptable to the customer 12 and indicates acceptance in step 178. If the alternate date is accepted, the process branches to step 180 (FIG. 4B). Otherwise, the process returns to step 174 and a next available date is searched. This process is iteratively repeated until an acceptable date is agreed on.

In step 180 (FIG. 4B), the install date and the work order number are returned and displayed on the operator terminal 60. The service operator reads the install date and work order number to the customer for customer reference. Meanwhile, the SPA 50 generates a customer record (step 182) using information input using the template by the service operator. After the customer record is generated, the SPA 50 retrieves usage tables respecting the service distribution equipment 60 selected in step 164, and records the terminal address, card and port number in the customer record (step 184). Thereafter, SPA 50 generates and attaches multi-line records, well known in the art, to the customer record (step 186). In step 188, the SPA 50 determines, by examining the customer record, whether Internet service was requested. If so, the SPA 50 queries the ISP 26 (FIG. 2) to retrieve the Internet service User Identification and Password (step 190). The SPA 50 then inserts the User Identification and Password into the customer record in step 192. Thereafter, the SPA 50 generates a work order notification (step 194) and dispatches the work order notification to an installation technician (step 196).

The work order notification is dispatched using an automated alphanumeric paging service, although other notification services, such as electronic mail, may likewise be used. Information included in the alphanumeric pager message is dependent on message capacity, but preferably includes the customer name, telephone number and address, as well as service distribution terminal ID, card number, port number, installation date and installation time. Sending of the work order notification completes the pre-installation operations, and the SPA 50 ceases further processing of the customer service order until the install date. In step 198, the technician performs the installation on the install date agreed to in steps 170–178. If, for any reason, the installation cannot be accomplished (customer ill, not at home, for example), the service technician using an appropriate interface, such as a Worldwide Web page, for example, reports the installation failure, and the SPA 50 automatically reschedules the installation (not shown).

As explained above, when the CPE is powered on after installation, the CPE 40 automatically sends Media Access Control Identification (MAC ID) and Serial Number information in an auto-discovery message to the SPA 50. The SPA 50 receives the MAC ID and Serial Number information in step 200. That information is associated with a tag that identifies the services terminal address, as well as the card and port number. In step 202, the SPA 50 uses the MAC ID and Serial Number to consult an inventory control list to confirm that the CPE 40 is a registered device obtained from approved inventory. If no match is found in the inventory control list, an alarm is raised in step 204 and a report is generated containing the MAC ID and Serial Number, as well as the terminal address, card and port number. The report is forwarded to operations and administration, and the process ends. If the MAC ID and Serial Number are located in the inventory control list, the inventory control list is updated (step 206) by marking the unit as "in use" and identifying the service address. Preferably, the inventory control list is scanned to determine the number of CPE units 40 left in inventory, and that number is compared to a threshold value (step 208). If the number of CPE units 40 left in inventory is less than a predetermined threshold, an order for a predetermined number of CPE units 40 is generated in step 210.

In any case, the SPA 50 uses the terminal address, port and card number to retrieve a customer record (step 212) to which the terminal address, card and port number were assigned in step 184 (FIG. 4B). If the customer record is not successfully retrieved (step 214) the program branches back to step 204. An alarm is raised to indicate that the customer record was not found, and to report the terminal address, port and card number associated with the auto-discovery message sent by the CPE 40 in step 200 (FIG. 4B). If, however, it is determined in step 214 that the customer record was successfully retrieved, the install date recorded in the customer record is compared with the system date of SPA 50 in step 216. If there is a mis-match, an installation date mis-match notification is generated and posted to the attention of systems operation and administration (step 218). If the installation date matches the system date, the operation continues at step 220 (FIG. 4D) where the CPE is enabled for content delivery.

In order to enable the CPE for content delivery, the SPA 50 sends a service enable message to the broadcast manager 58 (FIG. 2), which instructs the broadcast manager 58 (FIG. 2) to display a "barker channel" on the television 44 connected to CPE 40 (FIG. 1). When the technician sees the barker channel displayed, the technician has confirmation that the installation for video service delivery is complete and functional. The technician also has confirmation that broadband service delivery is functional and that other services such as high-speed Internet can be installed, if they are part of the work order requested by the customer 12. The technician then completes service setup in accordance with service level agreements with the respective service providers. After completing service setup, the technician, typically at the end of a work day, inputs job status information to the SPA 50 using, for example, a Worldwide Web interface. The SPA 50 routinely checks for end-of-day (step 224) and receipt of job-status reports (not shown). If at the end of any day a job-status report is not received for each job scheduled during that day by any technician as determined in step 226, the SPA 50 generates a status-pending report and queues the report for follow-up by system operation and administration staff (step 228). For each job-status report received, the SPA 50 determines in step 230 where the job was completed. If a job-status report indicates that the job was not completed, the job is automatically rescheduled. To accomplish this, the SPA 50 first checks the technician schedule in step 232 and a time slot that appears to be adequate to complete the job is selected. A work notification is then generated (step 234) and the work notification is dispatched to the technician at step 236 using an alphanumeric paging system or electronic mail, as also described above. If it is determined in step 230 that the job was completed, a positive completion report is generated and dispatched to systems operation and administration (step 238).

The SPA 50 therefore significantly reduces the time, effort and manpower required to provision telecommunications services. Although the service delivery mechanism described above refers explicitly to VDSL as an example, it should be understood that the SPA 50 can likewise be used to provision other services such as Asynchronous Subscriber Digital Loop (ADSL), etc.

Figure 5A:
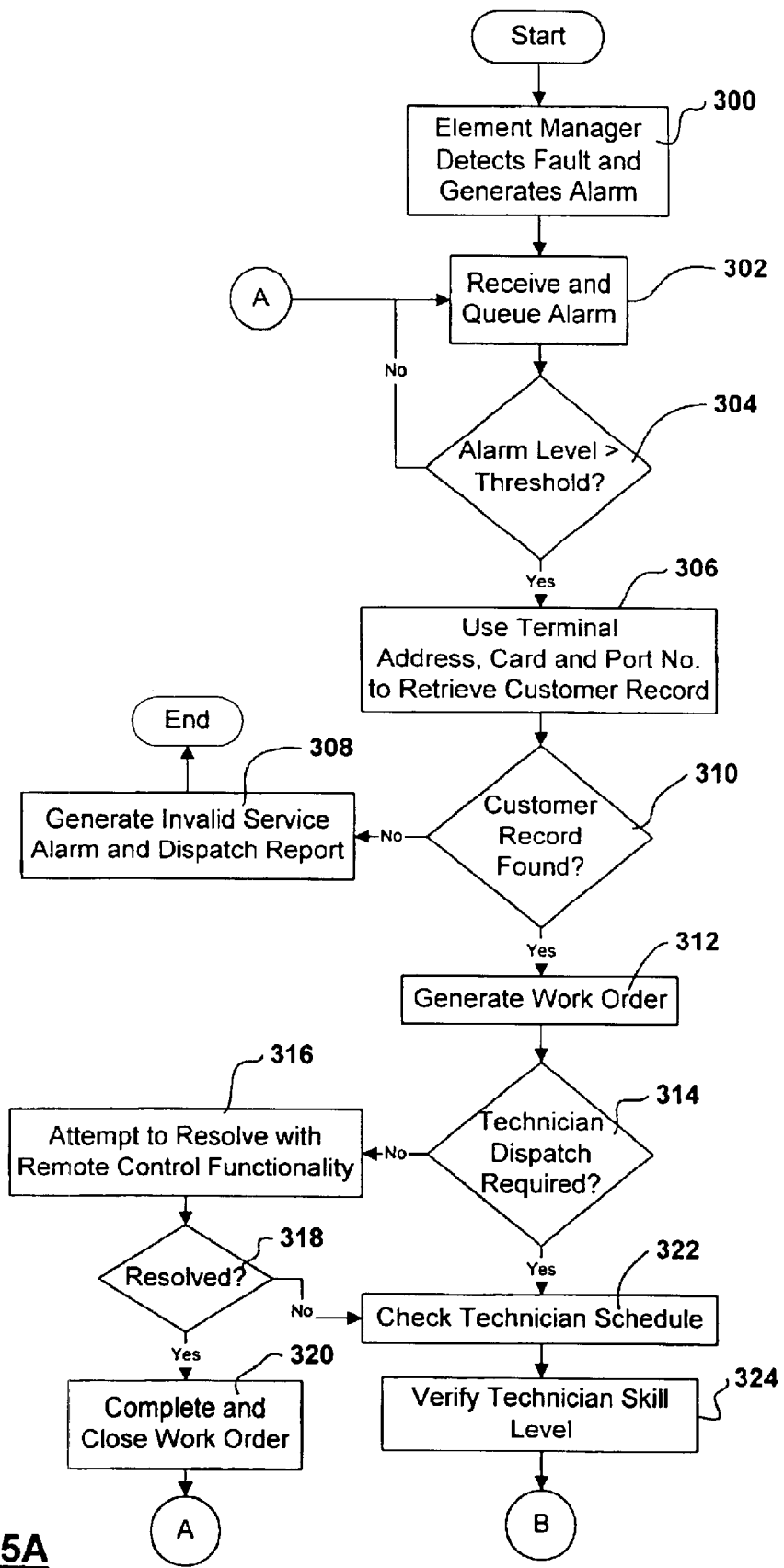
FIGS. 5A and 5B are flow charts illustrating a method for automating substantial parts of service assurance for telecommunications services in which fault detection and resolution scheduling are automated.
Figure 5B:
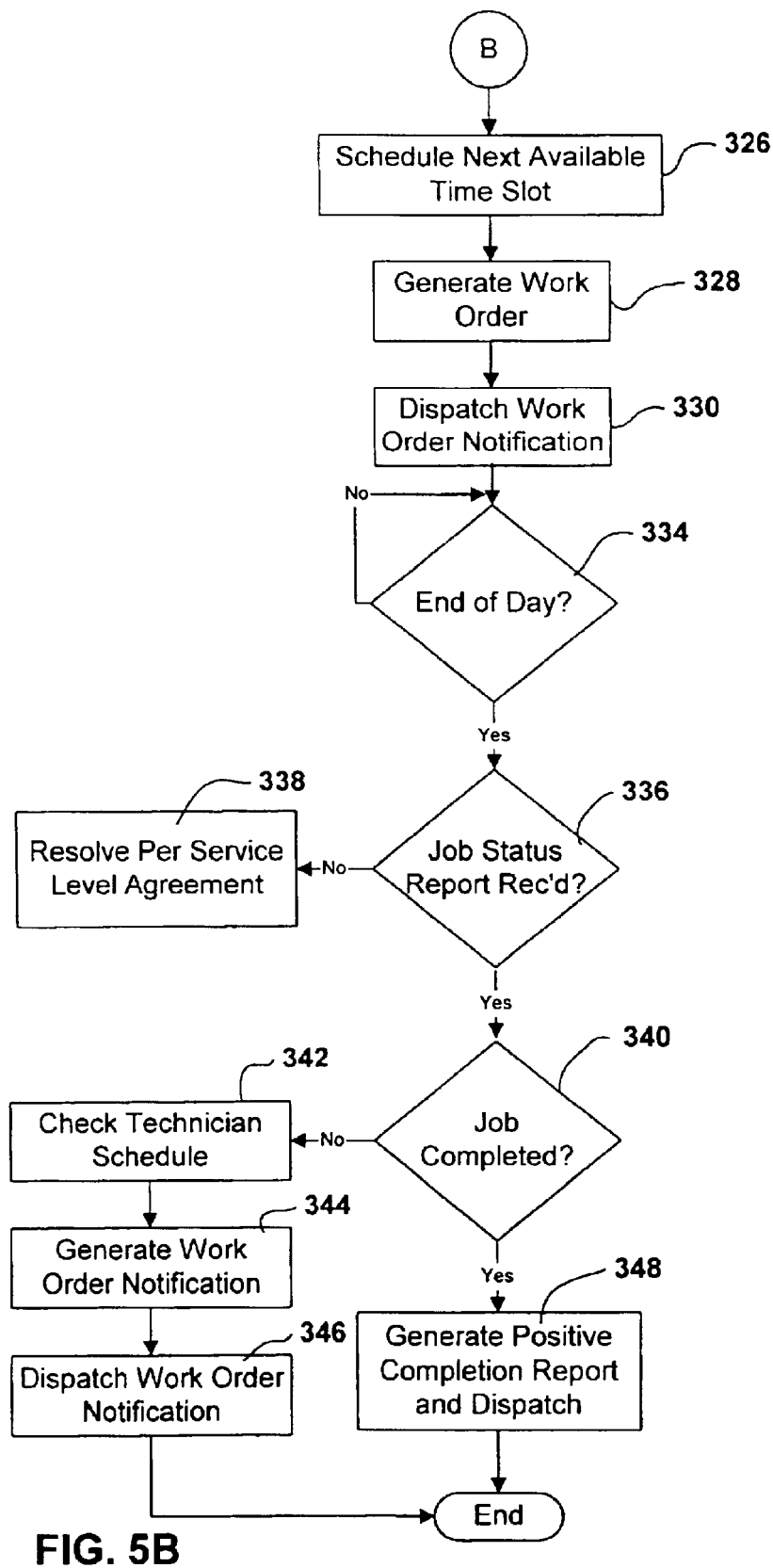

The SPA 50 also facilitates continuing service assurance. One of the principal ways in which the SPA 50 facilitates continuing service assurance is detailed in flow charts shown in FIGS. 5A and 5B. As shown in FIG. 5A, the element manager 56 (FIG. 2) monitors the status of the service distribution equipment 28, the CPEs 40, the broadband optical switch 18, and other system components used to deliver telecommunications services to the customer 12. The element manager 56 routinely detects faults and generates alarms in a manner well known in the art (step 300). Those alarms are received by the SPA 50 and the alarms are queued in step 302. As each alarm is queued, the alarm level is examined to determine whether the alarm level exceeds a predetermined threshold (step 304). If the alarm does not exceed the predetermined threshold, the process loops back to step 302.

If the alarm exceeds the predetermined threshold and it is determined that the alarm relates to a CPE 40 (FIG. 1), the terminal address card and port number of the CPE are used to retrieve the customer record (step 306). If the customer record is not found (step 310), the SPA 50 generates an invalid service alarm and dispatches a report to operations and administration (step 308) and the process ends. If the customer record is found, SPA 50 generates a work order (step 312) and determines (step 314) whether technician dispatch is required by examining the alarm level and the type of alarm, for example. If the technician dispatch does not appear to be required, the SPA 50 attempts to resolve the fault using remote control functionality to, for example, perform a warm restart of the CPE 40 (step 316). If the fault is resolved using the remote control functionality as determined in step 318, the work order is completed and closed in step 320. Otherwise, the technician schedule is consulted in step 322 to select an appropriate technician by verifying technician skill level (step 324), given information deduced from the type of alarm and alarm level. A next available time slot for a technician with an appropriate skill level is scheduled in step 326. A work notification is then generated in step 328. The work notification is dispatched, via an alphanumeric page or e-mail as described above, in step 330.

At the end of the day for which the work notification was generated, as determined in step 334, the SPA 50 checks (step 336) to determine whether a work completion report was received from the technician. As described above, the work-completion reports are completed by each technician at some point during each working day. If a work-completion report was not received, the SPA resolves the issue per a service level agreement, for example (step 338). If the work-completion report respecting the job was received, the report is examined to determine whether the work was completed (step 338). If the work was not completed, the technician schedule is consulted in step 340. A next available time slot that appears to be adequate to complete the job is selected and a new work notification is generated (step 342). The work notification is then dispatched to the technician using an alphanumeric page or an electronic mail message (step 344). If, however, it is determined in step 338 that the repair was completed, a positive completion report is generated in step 346 and the report is dispatched to system operations and maintenance personnel. The process is then completed.

Although the service assurance process was described above with explicit reference to a CPE 40, it should be noted that, as described above, the SPA 50 also monitors alarms respecting service distribution equipment 28 (FIG. 2) as well as other system components, and follows similar procedures to correct faults using remote control functionality as described above, and schedules and dispatches technicians for repair, if necessary. It should be further noted that with respect to network components used for delivery of services, the scheduling of repairs is based on an urgency level determined by the type and level or alarm. If a component failure occurs that affects service to a plurality of customers, standby technicians may be scheduled to perform repairs on an immediate basis. It should also be noted that with respect to continuing service assurance, service faults may also be reported by a customer 12 using the phone link to an operator at operator workstation 60 (FIG. 2). Faults reported in this way are handled in much the same way as service requests, as described above in detail with reference to FIGS. 4A–4D.

The SPA 50 therefore provides a flexible system that ensures rapid cost-effective service provisioning and responsive, efficient service assurance at a reduced cost to the service provider and at an improved satisfaction level to the service customer.

The embodiments of the invention described above are intended to be exemplary only. The scope of the invention is therefore intended to be limited solely by the scope of the appended claims.

We claim:

1. A method of provisioning converged telecommunication services, the method comprising:

accepting a first code supplied by a customer requesting at least one telecommunication service available through the converged telecommunication services;

selecting from a list of at least one telecommunication service-ready dwelling unit associated with the first code in which the customer resides;

selecting service distribution equipment to serve the customer;

building a customer record comprising customer information and an indication of the selected service distribution equipment; and automatically dispatching a work order to a technician selected to install customer premise equipment (CPE) in the dwelling unit.

2. The method as claimed in 1, wherein the step of accepting the first code further comprises:

verifying that the first code is associated with at least one telecommunications service-ready dwelling unit;

verifying that there is equipment capacity to serve the customer at the at least one telecommunications service-ready dwelling unit; and returning an error message if either of the first and second steps of verifying fails.

3. The method as claimed in claim 1, wherein the step of selecting from a list of at least one telecommunication service-ready dwelling unit further comprises:

verifying that there is equipment capacity to serve the customer at the dwelling unit selected; and returning an error message if the equipment capacity does not exist.

4. The method as claimed in claim 3, wherein if the customer subscribes to an Internet service as a part of the converged service offering, the step of building a customer record further comprises:

using at least a part of the customer information to retrieve from Internet Service Provider (ISP) equipment maintained by an ISP providing the Internet service, a customer User Identification and User Password assigned to the customer, and inserting the Customer User Identification and User Password into the customer record.

5. The method as claimed in claim 1, wherein the selecting service distribution equipment comprises selecting a service distribution equipment terminal address to serve the customer and an available card and port of the service distribution terminal.

6. The method as claimed in claim 1 further comprising:

accepting a CPE installation date in response to a request from the customer;

consulting a technician work schedule to confirm that a technician is available to perform a CPE installation on the CPE installation date; and if a technician is not available on the requested CPE installation date, checking the technician work schedule for a date when a technician is available to perform the CPE installation, and displaying the date.

7. The method as claimed in claim 6 further comprising consulting a technician skill set database in addition to consulting the technician work schedule, to ensure that an available technician possesses a skill set required to perform the CPE installation.

8. The method as claimed in claim 1, wherein the step of automatically dispatching a work order comprises:

formulating an alphanumeric message respecting the CPE installation; and sending the alphanumeric message to a communications device associated with the technician.

9. The method as claimed in claim 8, wherein the step of sending the alphanumeric message comprises a step of sending an alphanumeric message to an alphanumeric pager of the technician.

10. The method as claimed in claim 8, wherein the step of formulating the alphanumeric message comprises a step of formulating a message containing a service order number; customer information; and a date on which the technician is to perform the installation.

11. The method as claimed in claim 8, wherein the step of formulating the message further comprises including in the message a location of a service distribution terminal selected to provide service to the customer, and further inserting a terminal identifier that identifies the service distribution terminal selected to provide service to the customer.

12. The method as claimed in claim 1 further comprising:

receiving a media access control identification (MAC ID) and serial number of the CPE, as well as a service distribution terminal address card and port number to which the CPE is connected, after the technician installs and activates the CPE;

matching the service distribution terminal address card and port number with a service distribution terminal address card and port number stored in the customer record; and recording the MAC ID and serial number of the CPE in the customer record.

13. A method as claimed in claim 12 further comprising:

checking the MAC ID and serial number of the CPE against a list of MAC ID and serial number pairs associated with registered CPEs available for service use; and if a match is not found in the list, formulating an alarm message and sending the alarm message to system administration.

14. A method as claimed in claim 13 wherein, if a match is found, the method further comprises formulating a service enable message and forwarding the service enable message to a broadcast management system, which on receipt of the service enable message sends a barker channel signal to the CPE to verify to the technician that the CPE is correctly configured and connected to receive content from a video content provider.

15. A method as claimed in claim 14 further comprising:

receiving confirmation from the technician that all requested telecommunications services have been enabled;

generating service completion reports to each service provider from which service was requested; and forwarding the service completion reports to the respective service providers.

16. A system for control of converged telecommunication services comprising:

a server having a communication connection with service provision control systems operated by respective service providers that provide the converged telecommunication services, the server receiving and verifying information related to a customer request for at least one telecommunication service available through the converged telecommunication services, selecting service distribution equipment to serve the customer, and automatically scheduling customer premise equipment (CPE) installation by a technician if the information is verified and service distribution equipment is available to be used to service the customer request.

17. The system as claimed in claim 16, wherein the server is further adapted to insert an address of the service distribution terminal into a customer record, and to automatically select a card and port number of the service distribution terminal and insert each into the customer record.

18. The system as claimed in claim 16 further comprising a computing apparatus for accepting input of the information related to a customer request for the telecommunication service, wherein the computing apparatus displays a data input template to facilitate the input of the information.

19. The system as claimed in claim 16, wherein the server as adapted to query a database containing a list of technicians available to perform service provisioning, the database including an indication of a skill level of each of the technicians.

20. The system as claimed in claim 19, wherein the server is further adapted to query a technician scheduling application program to determine a work schedule of each technician to permit the server to automatically schedule a CPE installation date using technician skill levels retrieved from the database and technician availability retrieved from the technician scheduling application program.

21. The system as claimed in claim 20, wherein the server is further adapted to return the CPE installation date to confirm that the installation date is acceptable to the customer and to accept a response indicating whether the installation date is acceptable to the customer.

22. The system as claimed in claim 16, wherein the server is further adapted to automatically advise the technician of a CPE installation date.

23. The system as claimed in claim 22, wherein the server is adapted to advise the technician using an alphanumeric message sent to the technician via an alphanumeric paging system.

24. The system as claimed in claim 22, wherein the server is adapted to advise the technician using an electronic mail message sent to the technician via an electronic mail system.

25. The system as claimed in claim 16, wherein the server is further adapted to receive job status inputs from the technician, and to generate successful completion reports for completed jobs, and to reschedule uncompleted jobs.

26. The system as claimed in claim 16, wherein the server is further adapted to receive an auto-discovery message from a CPE that is powered on, and to use information in the auto-discovery message to determine whether the CPE is a registered unit approved for use in the system.

27. The system as claimed in claim 26, wherein the server is further adapted to update an inventory list when the CPE is determined to be a registered unit approved for use in the system.

28. The system as claimed in claim 27, wherein the server is further adapted to place an order for at least one more CPE when the updated inventory list indicates that a number of CPEs in inventory is less than a predetermined threshold.

29. The system as claimed in claim 16, wherein the server is further adapted to receive alarm messages from an element manager that monitors equipment used to deliver the telecommunications service, and farther adapted to screen the alarm messages for alarm messages that warrant action by the server.

30. The system as claimed in claim 26, wherein the server is further adapted to use remote control functionality to correct element faults reported in the alarm messages that warrant action by the server.

31. The system as claimed in claim 27, wherein the server is further adapted to schedule a technician to correct element faults reported in the alarm messages if the alarm message indicates that remote control functionality cannot be used to correct the element fault, or remote control functionality fails to correct the element fault.

32. A system for control of converged telecommunications services comprising:
   a server having a communications connection with service provision control systems operated by respective service providers that provide the converged telecommunications services, the server receiving and verifying information related to a customer request for the converged telecommunications services, selecting and assigning service distribution equipment to serve the customer, and automatically authorizing customer premise equipment (CPE) installation if the information is verified and service distribution equipment is available to be used to service the customer request.

33. The system as claimed in claim 32, wherein the server is further adapted to receive an auto-discovery message from a CPE that is powered on, and to use information in the auto-discovery message to determine whether the CPE is a registered unit approved for use in the system.

34. The system a claimed in claim 33, wherein the server is further adapted to update an inventory list when the CPE is determined to be a registered unit approved for use in the system.

35. The system as claimed in claim 34, wherein the server is further adapted to place an order for at least one more CPE when the updated inventory list indicates that a number of CPEs in inventory is less than a predetermined threshold.

36. The system as claimed in claim 32, wherein the server is further adapted to receive alarm messages from an element manager that monitors equipment used to deliver the telecommunications services, and further adapted to screen the alarm messages for alarm messages that warrant action by the server.

37. The system as claimed in claim 36, wherein the server is further adapted to use remote control functionality to correct element faults reported in the alarm messages that warrant action by the server.

38. The system as claimed in claim 37, wherein the server is further adapted to schedule a technician to correct element faults reported in the alarm messages if the alarm message indicates that remote control functionality cannot be used to correct the element fault, or remote control functionality fails to correct the element fault.

39. A method of control of converged telecommunication services by a computing apparatus having a communication connection with service provision control systems operated by respective service providers that provide the converged telecommunication services, the method comprising: receiving and verifying information related to a customer request for at least one telecommunication service available through the converged telecommunication services; selecting service distribution equipment to serve the customer; and
   automatically authorizing customer premise equipment (CPE) installation if the information is verified and service distribution equipment is available to be used to service the customer request.

40. The method as claimed in claim 39 further comprising receiving an auto-discovery message from a CPE that is powered on and using information in the auto-discovery message to determine whether the CPE is a registered unit approved for use in the system.

41. The method as claimed in claim 40 further comprising updating an inventory list when the CPE is determined to be a registered unit approved for use in the system.

42. The method as claimed in claim 41 further comprising placing an order for at least one more CPE when the updated inventory list indicates that a number of CPEs in inventory is less than a predetermined threshold.

43. The method as claimed in claim 39, further comprising receiving alarm messages from an element manager that monitors equipment used to deliver the telecommunications services and screening the alarm messages for alarm messages that warrant action.

44. The method as claimed in claim 43 further comprising using remote control functionality to correct element faults reported in the alarm messages that warrant action.

45. The method as claimed in claim 44 further comprising scheduling a technician to correct element faults reported in the alarm messages if the alarm message indicates that remote control functionality cannot be used to correct the element fault, or remote control functionality fails to correct the element fault.

* * * * *